(12) United States Patent
Strashny et al.

(10) Patent No.: US 7,637,845 B2
(45) Date of Patent: Dec. 29, 2009

(54) SYSTEM AND METHOD FOR CONTROLLING VEHICLE SPEED

(75) Inventors: Igor Strashny, Grenoble (FR); Andrew O. Fonkalsrud, Grenoble (FR)

(73) Assignee: Caterpillar Inc., Peoria, IL (US)

( * ) Notice: Subject to any disclaimer, the term of this patent is extended or adjusted under 35 U.S.C. 154(b) by 456 days.

(21) Appl. No.: 11/543,941

(22) Filed: Oct. 6, 2006

(65) Prior Publication Data

US 2007/0082786 A1    Apr. 12, 2007

Related U.S. Application Data

(60) Provisional application No. 60/724,813, filed on Oct. 11, 2005.

(51) Int. Cl.
*B60W 10/06* (2006.01)
*B60W 10/10* (2006.01)

(52) U.S. Cl. .................. 477/108; 477/110; 477/111

(58) Field of Classification Search ............... 477/108
See application file for complete search history.

(56) References Cited

U.S. PATENT DOCUMENTS

| | | |
|---|---|---|
| 4,721,018 A | 1/1988 | Harada et al. |
| 4,740,898 A | 4/1988 | McKee et al. |
| 4,864,894 A | 9/1989 | Falzoni |
| 5,142,928 A | 9/1992 | Buti et al. |
| 5,406,483 A | 4/1995 | Kallis et al. |
| 5,520,588 A | 5/1996 | Hall, III |
| 5,520,591 A | 5/1996 | Hohnstein |
| 5,527,232 A | 6/1996 | Seidel et al. |
| 5,553,453 A | 9/1996 | Coutant et al. |
| 5,560,203 A | 10/1996 | Pollman |
| 5,890,991 A | 4/1999 | Sakakiyama |
| 5,924,955 A | 7/1999 | Ishii et al. |
| 6,080,074 A | 6/2000 | Ulbrich et al. |

(Continued)

FOREIGN PATENT DOCUMENTS

DE     101 61 900     8/2002

(Continued)

OTHER PUBLICATIONS

International Search Report issued in International Application No. PCT/US2008/001244 on Jun. 9, 2008.

(Continued)

*Primary Examiner*—Sherry L Estremsky
*Assistant Examiner*—Edwin A Young
(74) *Attorney, Agent, or Firm*—Finnegan, Henderson, Farabow, Garrett & Dunner

(57) ABSTRACT

A system is provided for controlling the speed of a vehicle having a power plant and a transmission. A control unit is configured to receive a signal indicative of the speed of the vehicle. The control unit is further configured to determine a desired output speed of the power plant based on the signal indicative of the speed of the vehicle, a signal indicative of the gear ratio of the transmission, and a desired vehicle speed associated with the gear ratio. The control unit is also configured to send a signal to the power plant, such that power plant operates at an output speed that substantially maintains the desired vehicle speed in a manner substantially independent of a magnitude of load on the power plant.

27 Claims, 5 Drawing Sheets

| TRANSMISSION GEAR RATIO | 3-SPEED RANGE (NORMAL) MODE | | | 5-SPEED RANGE (MULTI-SPEED) MODE | | |
|---|---|---|---|---|---|---|
| | SPEED RANGE | DISPLAY | SPEED (KPH) | SPEED RANGE | DISPLAY | SPEED (KPH) |
| 3F | 3 | 3F | 9.8 | 5 | 3.5F | 9.8 |
| | | | | 4 | 3.0F | 7.4 |
| 2F | 2 | 2F | 5.7 | 3 | 2.5F | 5.6 |
| | | | | 2 | 2.0F | 4.2 |
| 1F | 1 | 1F | 3.2 | 1 | 1.5F | 3.1 |
| N | 0 | N | 0 | 0 | N | 0 |
| 1R | -1 | 1R | -4.2 | -1 | 1.5R | -3.2 |
| 2R | -2 | 2R | -7.4 | -2 | 2.0R | -4.6 |
| | | | | -3 | 2.5R | -7.2 |
| 3R | -3 | 3R | -12.7 | -4 | 3.0R | -8.5 |
| | | | | -5 | 3.5R | -11.2 |

U.S. PATENT DOCUMENTS

| | | | |
|---|---|---|---|
| 6,157,884 | A | 12/2000 | Narita et al. |
| 6,183,390 | B1 | 2/2001 | Koga et al. |
| 6,246,940 | B1 | 6/2001 | Ochiai et al. |
| 6,247,378 | B1 | 6/2001 | Newendorp et al. |
| 6,350,216 | B1 | 2/2002 | Speicher et al. |
| 6,428,438 | B1 | 8/2002 | Bowen |
| 6,553,302 | B2 | 4/2003 | Goodnight et al. |
| 6,622,075 | B1 | 9/2003 | Reuschel et al. |
| 6,633,805 | B2 | 10/2003 | Burgart et al. |
| 6,671,602 | B1 | 12/2003 | Speicher et al. |
| 6,766,231 | B2 | 7/2004 | Nakagawa et al. |
| 6,845,684 | B2 | 1/2005 | Inaba et al. |
| 6,961,646 | B2 | 11/2005 | Soliman et al. |
| 7,076,335 | B2 | 7/2006 | Seeman |
| 7,107,135 | B2 | 9/2006 | Soliman et al. |
| 2005/0278100 | A1* | 12/2005 | Porter .................. 701/50 |
| 2006/0065467 | A1 | 3/2006 | Schuh |
| 2007/0082786 | A1 | 4/2007 | Strashny et al. |

FOREIGN PATENT DOCUMENTS

| | | |
|---|---|---|
| EP | 0270197 | 6/1988 |
| EP | 1 172 248 | 1/2002 |
| EP | 1 277 610 | 1/2003 |
| JP | 01153862 | 6/1989 |
| JP | 2002168339 | 6/2002 |
| JP | 2005126020 | 5/2005 |

OTHER PUBLICATIONS

Michael D. Anderson et al., Copending U.S. Appl. No. 11/316,894, filed Dec. 27, 2005 (41 pages).

Norval P. Thomson, Copending U.S. Appl. No. 11/700,196, filed Jan. 31, 2007 (22 pages).

Ibamoto et al., "Advanced Technology of Transmission Control," Hitachi Review, vol. 39, No. 5, Oct. 1, 1990, pp. 307-312, XP000219781 ISSN: 0018-277X.

Office Action issued in Copending U.S. Appl. No. 11/316,894, mailed Jan. 9, 2008 (16 pages).

Reply to Office Action issued in Copending U.S. Appl. No. 11/316,894, filed May 9, 2008 (37 pages).

Takeshi et al., English-language Abstract of JP 01153862, dated Jun. 16, 1989 (1 page).

Tadashi et al., English-language Abstract of JP 2002168339, dated Jun. 14, 2002 (1 page).

Yoshio et al., English-language Abstract of JP 2005126020, dated May 19, 2005 (1 page).

* cited by examiner

| TRANSMISSION GEAR RATIO | 3-SPEED RANGE (NORMAL) MODE | | | 5-SPEED RANGE (MULTI-SPEED) MODE | | |
|---|---|---|---|---|---|---|
| | SPEED RANGE | DISPLAY | SPEED (KPH) | SPEED RANGE | DISPLAY | SPEED (KPH) |
| 3F | 3 | 3F | 9.8 | 5 | 3.5F | 9.8 |
| | | | | 4 | 3.0F | 7.4 |
| 2F | 2 | 2F | 5.7 | 3 | 2.5F | 5.6 |
| | | | | 2 | 2.0F | 4.2 |
| 1F | 1 | 1F | 3.2 | 1 | 1.5F | 3.1 |
| N | 0 | N | 0 | 0 | N | 0 |
| 1R | -1 | 1R | -4.2 | -1 | 1.5R | -3.2 |
| | | | | -2 | 2.0R | -4.6 |
| 2R | -2 | 2R | -7.4 | -3 | 2.5R | -7.2 |
| | | | | -4 | 3.0R | -8.5 |
| 3R | -3 | 3R | -12.7 | -5 | 3.5R | -11.2 |

*FIG. 4*

SYSTEM AND METHOD FOR CONTROLLING VEHICLE SPEED

This application claims the benefit of priority under 35 U.S.C. § 119(e) of U.S. Provisional Application No. 60/724,813, filed Oct. 11, 2005, the disclosure of which is incorporated herein by reference.

TECHNICAL FIELD

The present disclosure relates generally to systems and methods for controlling vehicle speed and, more particularly, to systems and methods for controlling vehicle speed via control of a power plant and/or a transmission of a vehicle.

BACKGROUND

A vehicle may include a power plant for providing power to operate a vehicle and a transmission for converting at least a portion of the power to work in order to propel the vehicle. The speed of the vehicle may be controlled by controlling the output of the vehicle's power plant and/or the by selecting a gear ratio of the vehicle's transmission. For example, a vehicle may include an internal combustion engine configured to operate within a range of engine speeds and a transmission configured to convert the engine speed to an output speed such that the vehicle travels at a speed that varies according to a combination of the engine speed and the ratio of the engine speed to the transmission output speed.

Some vehicles may include, for example, an internal combustion engine and a powershift transmission. For such vehicles, the output of the internal combustion engine may be operably connected to the powershift transmission via, for example, a torque converter configured to transfer power from the internal combustion engine to the input of the powershift transmission. The powershift transmission may include a gear assembly along with one or more clutches for selectively engaging combinations of the gears such that the ratio of the transmission's input speed to output speed may be selected to provide discrete gear ratios.

For some vehicles, such as work machines, it may be desirable to operate the vehicle within predetermined speed ranges. Each of the predetermined speed ranges may generally correlate, for example, to a particular gear ratio engaged in the transmission and a range of engine speeds of the internal combustion engine. For example, the transmission may include gears and clutches that permit the transmission to be engaged in three forward gear ratios and three reverse gear ratios. A vehicle with such a transmission configuration is able to operate in six speed ranges—three forward speed ranges and three reverse speed ranges, each corresponding to an engine speed and one of the six gear ratios. In other words, a vehicle having such a transmission configuration is limited to six speed ranges by virtue of the number of available speed ranges being limited to the number a transmission gear ratios.

One possible drawback of such conventional systems may relate to their lack of ability to provide a vehicle operator with more available speed ranges than the number of gear ratios available in the transmission. Providing more speed ranges than available gear ratios may be desirable, for example, to more closely tailor operation of the vehicle to an operator's preferences. For example, an operator may select a speed range based on considerations, such as, for example, the type of operation being performed by the vehicle (e.g., grading on relatively flat terrain or grading on relatively steep and/or uneven terrain), the condition of the terrain on which the vehicle is traveling, and/or the level of skill of the operator. By providing more available speed ranges than transmission gear ratios, an operator may be able to more closely tailor operations of the vehicle to the operating conditions and/or the operator's skill level. Another possible drawback with conventional systems may relate their inability to control the vehicle's speed as the engine experiences changing loads. It may be desirable to control operation of the engine and/or transmission such that the vehicle substantially maintains a desired speed in a manner substantially independent of the magnitude of the load experienced by the engine.

An example of a transmission control system for a vehicle having an internal combustion engine and a powershift transmission is described in U.S. Pat. No. 5,526,261 (the '261 patent) issued to Kallis et al. on Jun. 11, 1996. The '261 patent describes a transmission control system including a first electronic controller for providing transmission control signals required to command the powershift transmission to shift and operate in any particular one of its forward gears, and a second electronic controller for providing at least one engine control signal required to command the engine to operate at one of a number of different desired engine speeds and to monitor the actual engine speed. In the '261 patent's system, gear ranges are used that slightly overlap along with a throttle that is infinitely adjustable within a range of engine speeds, such that any given ground speed within the range of possible vehicle speeds can be achieved and maintained, so long as the engine is operating within its overall power envelope.

Although the system described in the '261 patent may control the vehicle's engine speed and powershift transmission's forward gears, the '261 patent's system still suffers from the drawbacks outlined above, such as, for example, an inability to maintain the vehicle's speed as the engine experiences changing loads.

The disclosed systems and methods for controlling vehicle speed are directed to overcoming one or more of the drawbacks set forth above.

SUMMARY OF THE INVENTION

In one aspect, the present disclosure includes a system for controlling the speed of a vehicle having a power plant and a transmission. A control unit is configured to receive a signal indicative of the speed of the vehicle. The control unit is further configured to determine a desired output speed of the power plant based on the signal indicative of the speed of the vehicle, a signal indicative of the gear ratio of the transmission, and a desired vehicle speed associated with the gear ratio. The control unit is also configured to send a signal to the power plant, such that power plant operates at an output speed that substantially maintains the desired vehicle speed in a manner substantially independent of a magnitude of load on the power plant.

In a further aspect, the present disclosure includes a vehicle including a power plant to provide power to the vehicle and a transmission operably coupled to the power plant, the transmission being configured to transfer the power provided by the power plant to propel the vehicle. The vehicle further includes driving members configured to propel the vehicle and a control unit configured to control operation of the power plant and the transmission. The control unit is configured to receive a signal indicative of speed of the vehicle. The control unit is further configured to determine a desired output speed of the power plant based on the signal indicative of the speed of the vehicle, a signal indicative of the gear ratio of the transmission, and a desired vehicle speed associated with the gear ratio. The control unit is also configured to send a signal to the power plant, such that power plant operates at an output speed that substantially maintains the desired vehicle speed in a manner substantially independent of a magnitude of load on the power plant.

In still a further aspect, the present disclosure includes a method for controlling the speed of a vehicle having a power plant and a transmission. The method includes sensing a signal indicative of the speed of the vehicle. The method further includes determining a desired output speed of the power plant based on the signal indicative of the speed of the vehicle, a signal indicative of the gear ratio provided by the transmission, and a desired vehicle speed associated with the gear ratio. The method also includes sending a signal to the power plant, such that the power plant operates at an output speed that substantially maintains the desired vehicle speed in a manner substantially independent of a magnitude of load on the power plant.

BRIEF DESCRIPTION OF THE DRAWINGS

FIG. 4 is table showing exemplary characteristics and modes of operation of an exemplary embodiment of a system for controlling vehicle speed.

DETAILED DESCRIPTION

Figure 1:
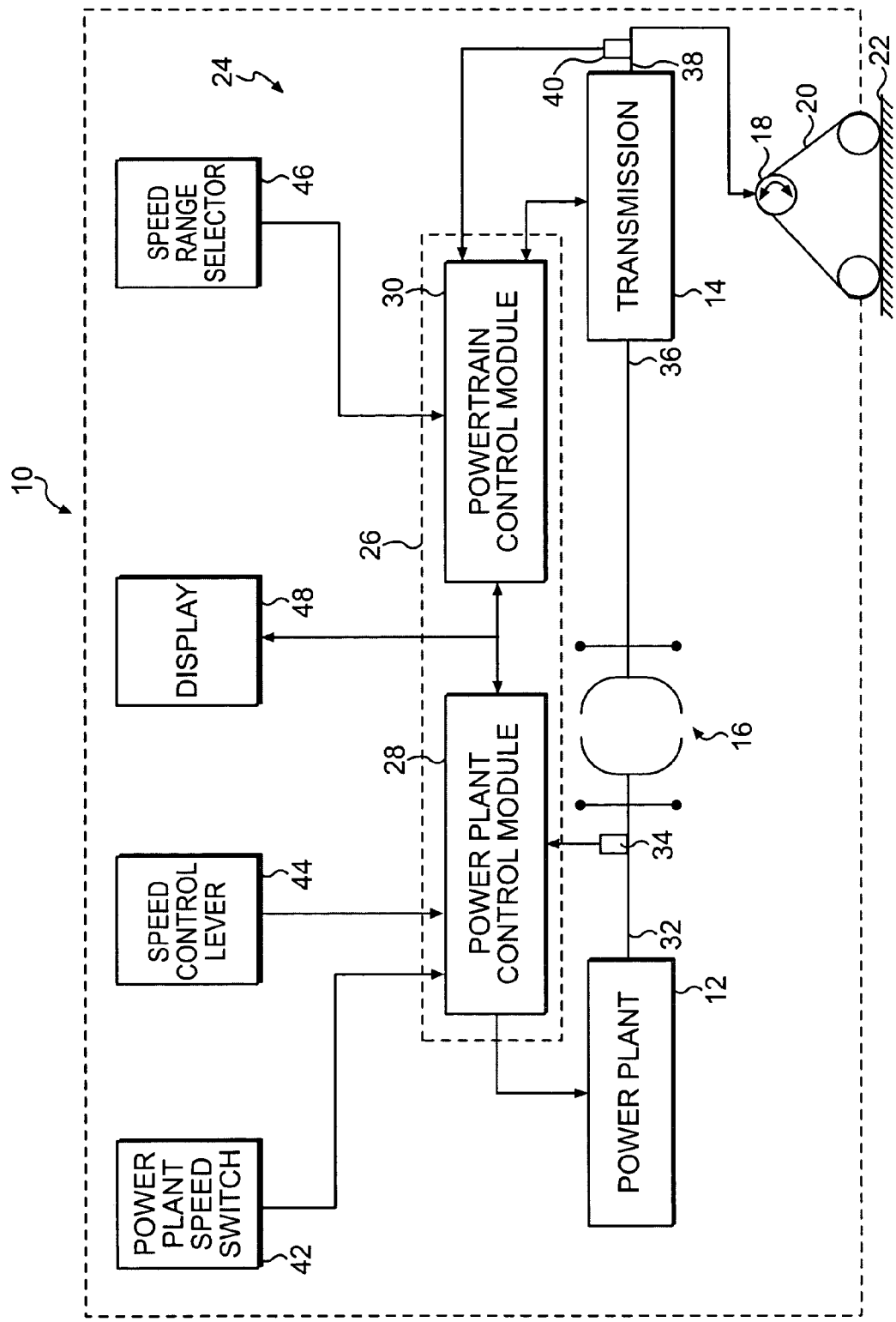
FIG. 1 is a schematic block diagram of an exemplary vehicle, including an exemplary embodiment of a system for controlling the speed of the vehicle.

FIG. 1 schematically depicts an exemplary vehicle 10, including a power plant 12 and a transmission 14 operably coupled to the power plant 12 via, for example, a torque converter 16. The output of transmission 14 may be operably coupled to one or more driving members 18 configured to provide power to one or more ground engaging tracks 20 for propelling vehicle 10 across terrain 22.

Power plant 12 may be an internal combustion engine, such as, for example, a spark-ignition engine or a compression-ignition such as a diesel engine. The use of other power plants known to those skilled in the art is contemplated. Transmission 14 may be a powershift transmission and may include a gear assembly and one or more clutch assemblies configured to provide a plurality of forward and/or reverse gear ratios that correlate to a ratio of the input speed of transmission 14 to the output speed of transmission 14. For example, transmission 14 may include one or more planetary gear trains and one or more clutches configured to selectively engage such that transmission 14 provides a plurality of forward and/or reverse gear ratios. Other types of transmissions known to those skilled in the art may be used.

The exemplary vehicle 10 schematically depicted in FIG. 1 is propelled via one or more ground engaging tracks 20. Vehicle 10 may be, for example, a track-type tractor, such as a dozer, a track-type loader, a hydraulic excavator, or any other vehicle known to those skilled in the art as having one or more ground engaging tracks. Furthermore, although vehicle 10 is depicted as including ground engaging track(s) 20, this disclosure is not limited to vehicles having ground engaging tracks. For example, vehicle 10 may be a vehicle configured to be propelled via one or more wheels, such as, for example, a wheel loader.

Vehicle 10 may include a system 24 for controlling vehicle speed. For example, system 24 may be configured provide an operator of vehicle 10 with the ability to select a speed range for vehicle 10's travel from among a plurality of available speed ranges. The number of speed ranges available for selection may be greater than, for example, the number of forward and/or reverse gear ratios of transmission 14. For example, transmission 14 may include a gear assembly and one or more clutches configured to provide three forward gear ratios and three reverse gear ratios, which generally provide six speed ranges—one speed range corresponding to each gear ratio. According to some embodiments, system 24 may be configured to provide more speed ranges than the number of gear ratios available in transmission 14. For example, system 24 may be configured to provide two or more speed ranges for one or more of the gear ratios of transmission 14.

System 24 may include a control unit 26, which may include a power plant control module 28 and a powertrain control module 30. Although the exemplary embodiment schematically depicted in FIG. 1 shows the power plant control module 28 and powertrain control module 30 as separate elements, power plant control module 28 and powertrain control module 30 are not necessarily separate from one another.

Power plant control module 28 may be operably coupled to power plant 12 and powertrain control module 30. Power plant control module 28 may be configured to control operation of power plant 12. For example, power plant control module 28 may be configured to control power output and/or output speed of power plant 12, for example, at power plant output shaft 32 by sending control signals to power plant 12. Further, power plant control module 28 may be configured to receive signals from a sensor 34 indicative of power plant 12's power output and/or speed output.

Powertrain control module 30 may be operably coupled to transmission 14 and power plant control module 28. Powertrain control module 30 may be configured to control operation of transmission 14. For example, powertrain control module may be configured to control the ratio of the speed of transmission 14's input shaft 36 to the speed of transmission 14's output shaft 38, for example, by sending control signals to transmission 14 such that one or more clutches of transmission 14 are engaged to result in a particular gear ratio. Further, powertrain control module 30 may be configured to receive signals from a sensor 40 indicative of the speed at which vehicle 10 travels across terrain 22, for example, a signal indicative of the speed of output shaft 38, which may, in turn, correlate to vehicle 10's speed. According to some embodiments, the speed at which vehicle 10 travels across terrain 22 may be determined via, for example, a radar system and/or a global positioning system, or via any other system and/or method known to those having skill in the art.

System 24 may further include a power plant speed switch 42 operably coupled to power plant 12 and/or control unit 26. For example, power plant speed switch 42 may be operably coupled to power plant control module 28 and may be configured to selectively change the modes of operation of system 24 between a normal mode and a multi-speed mode for controlling vehicle speed via manual control. For example, when system 24 is operating in the normal mode, an operator of vehicle 10 may be provided with a number speed ranges equal to the number of forward and/or reverse gear ratios provided by transmission 14. When system 24 is operating in the multi-speed mode, system 24 may provide an operator of vehicle 10 with a number of speed ranges greater than the number of forward and/or reverse gear ratios provided by transmission 14. For example, when system 24 is operating in the multi-speed mode, an operator of vehicle 10 may be provided with more forward speed ranges than the number of forward gear ratios provided by transmission 14 and/or with more reverse speed ranges than the number of reverse gear ratios provided by transmission 14.

System 24 may also include a speed control lever 44 operably coupled to power plant 10 and/or control unit 26. For example, speed control lever 44 may include a decelerator pedal configured to reduce, for example, the output speed of power plant 12. For example, speed control lever 44 may be configured to provide an operator with the ability to reduce the output speed of power plant output shaft 32, for example, when the operator desires to reverse vehicle 10's direction of travel and/or if vehicle 10 is operating in a relatively confined area.

System 24 may further include a speed range selector 46 operably coupled to control unit 26 and/or transmission 14. For example, speed range selector 46 may be operably coupled to powertrain control module 30 and may be configured to select a speed range for controlling the speed of vehicle 10. For example, speed range selector may include one or more switches or buttons for manually selecting a speed range corresponding to a speed at which vehicle 10 will travel. According to some exemplary embodiments, speed range selector 46 includes two buttons—one for selecting a higher speed range and one for selecting a lower speed range. By depressing the button for selecting a higher speed range, the selected speed range sequentially increases (e.g., the speed range increases from a first speed range to a second relatively faster speed range). According to some embodiments, if the button for selecting a higher speed range is depressed and held in the depressed position, the selected speed range will sequentially increase until either a desired speed range is selected or a maximum speed range is selected (e.g., the selected speed range will increase from a first speed range, to a second speed range, and so on, until the maximum speed range is selected). Conversely, by depressing the button for selecting a lower speed range, the selected speed range sequentially decreases (e.g., the speed range decrease from a second speed range to a first relatively slower speed range). Furthermore, according to some embodiments, if the button for selecting a lower speed range is depressed and held in the depressed position, the selected speed range will sequentially decrease until either a desired speed range is selected or the minimum speed range is selected (e.g., the selected speed range will decreases from a third speed range, to a second speed range, and so on, until the minimum speed range is selected).

Vehicle 10 may include a display 48 configured to provide an operator with information about the operation various components of vehicle 10. For example, display 48 may be operably coupled to control unit 26 and may be configured to display information related to the output of power plant 12, the selected speed range, and/or the gear ratio currently engaged in transmission 14.

For example, according to the exemplary embodiment of display 48 schematically depicted in FIGS. 2A-2F and FIGS. 3A-3C, display 46 may include a display panel 50 including an information read-out region 52 and an information identifier region 54. Information read-out region 52 may include LED and/or LCD components configured to provide alphanumeric information. Information identifier region 54 may include representations indicative of the meaning of information provided by information read-out region 52.

For example, information read-out region 52 may include a power plant output portion 56 configured to display the output speed of power plant 12; for example, the rotational speed of power plant output shaft 32 in revolutions per minute (rpm). Information read-out region 52 may further include a gear ratio/speed range mode display portion 58 configured to display the current gear ratio engaged in transmission 14, the current speed range mode selected, and/or the current direction of transmission gear ratio (i.e., forward direction or reverse direction).

Referring to FIGS. 2A-2F, the exemplary display 48 includes a gear ratio/speed range mode display portion 58, which includes regions 60, 62, and 64, respectively corresponding to information related to the current gear ratio engaged in transmission 14, the current speed range mode, and the current direction of transmission gear ratio when the system 24 for controlling vehicle speed is operating in the multi-speed mode.

Figure 3A:
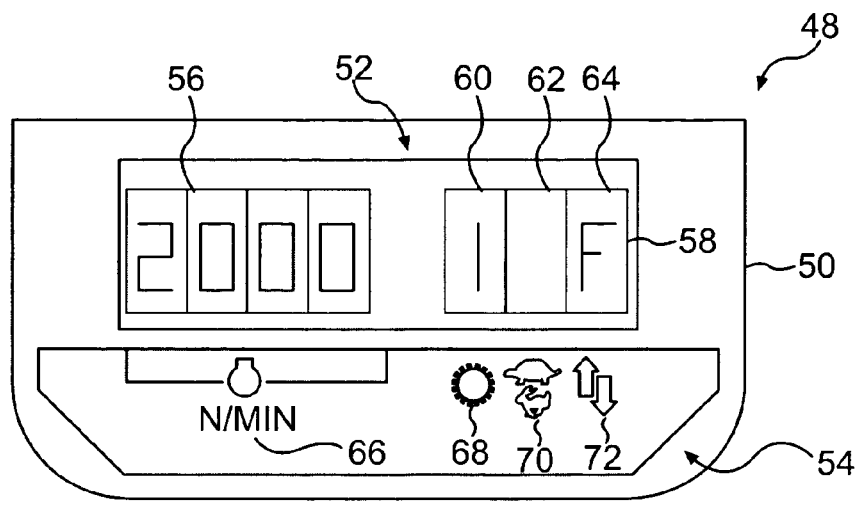
FIG. 3A is a schematic representation of an exemplary embodiment of a display indicating another vehicle status.
Figure 3B:
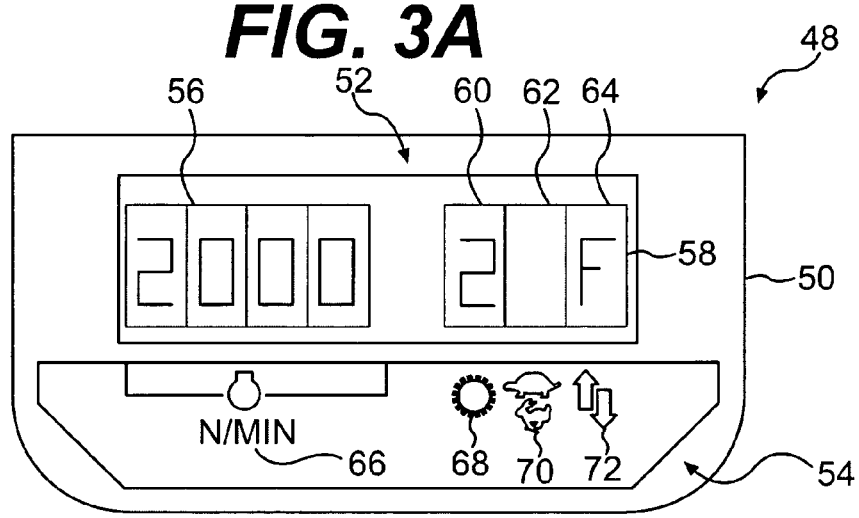
FIG. 3B is a schematic representation of an exemplary embodiment of a display indicating a further vehicle status.
Figure 3C:
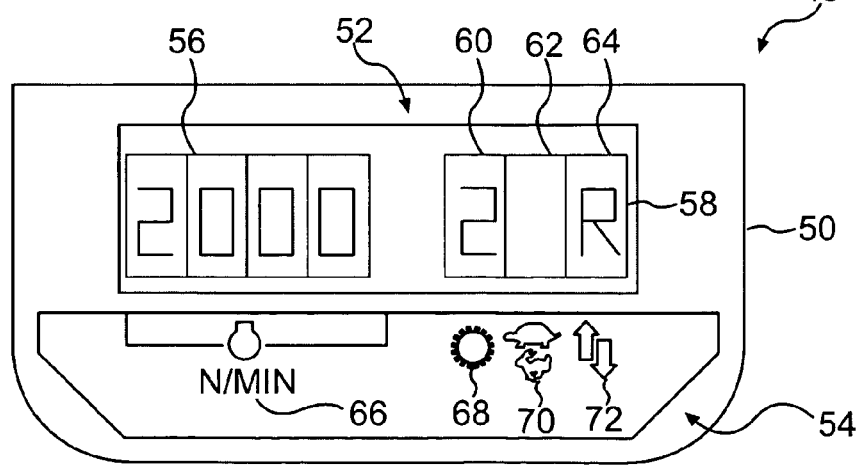
FIG. 3C is a schematic representation of an exemplary embodiment of a display indicating yet another vehicle status.

Referring to FIGS. 3A-3C, the exemplary display 48 includes a gear ratio/speed range mode display portion 58, which includes regions 60 and 64, respectively corresponding to information related to the current gear ratio engaged in transmission 14 and the current direction of transmission gear ratio when the system 24 for controlling vehicle speed is operating in the normal mode. The region 62 may be configured to remain blank when system 24 is operating in the normal mode.

Information identifier region 54 may include representations indicative of the meaning of information provided by information read-out region 52. For example, information identifier region 54 may include one or more symbols 66 configured to be indicative to an operator that information displayed in power plant output portion 56 relates to the output speed of power plant 12. Further, display 48 may include one or more symbols 68 configured to be indicative to an operator that information displayed in region 60 relates to a current gear ratio of transmission 14. For example, symbol 68 may be a representation of a gear or any other symbol tending to indicate a gear ratio and/or transmission. Display 48 may further include one or more symbols 70 configured to be indicative to an operator that information displayed in region 62 relates to the current speed range mode of system 24. For example, symbol 70 may include a representation of a turtle and/or a rabbit, or any other symbol tending to indicate a change in speed and/or mode of operation. Display 48 may also include one or more symbols 72 configured to be indicative to an operator that information displayed in region 64 relates to the current direction of the gear ratio of transmission 14. For example, symbol 72 may include a representation of arrows pointing in opposite directions or any other symbol tending to indicate direction and/or direction change.

INDUSTRIAL APPLICABILITY

The disclosed systems and methods for controlling vehicle speed may be used to provide an operator with more speed ranges than the number of gear ratios available in a vehicle's transmission. This may allow an operator of the vehicle to more closely tailor the performance of the vehicle to the conditions under which the vehicle is operating, such as, for example, the type of operation being performed by the vehicle (e.g., grading on relatively flat terrain or grading on relatively steep and/or uneven terrain), the condition of the terrain on which the vehicle is traveling, and/or the level of skill of the operator.

In the following description of exemplary embodiments of this disclosure, vehicle 10 includes a pair of ground engaging tracks 20. Exemplary embodiments disclosed are not limited to use with vehicles having ground engaging tracks and may be used with, for example, wheeled vehicles.

According to some embodiments, vehicle 10 may include a power plant speed switch 42 configured to provide an operator with the ability to manually select between normal and multi-speed modes of operation for controlling vehicle speed.

According to some embodiments, system 24 may be configured to automatically select between modes of operation based on certain predetermined parameters, such as, for example, maximum and/or minimum power plant output speed. Furthermore, system 24 may be configured to use a combination of normal and multi-speed modes of operation.

When operating in normal mode, system 24 may be configured to provide vehicle 10's operator with a number of speed ranges equal to the number of gear ratios available in transmission 14. For example, vehicle 10 may include a transmission 14, including a gear assembly and one or more clutches configured to provide three forward gear ratios and three reverse gear ratios, thus providing a total of six speed ranges for operation of vehicle 10. Each speed range may correspond to a desired target vehicle speed of travel. For example, for the third forward gear ratio (with system 24 set in normal mode), the speed range may correspond to a target vehicle speed of about 9.8 kph. System 24 may be configured to substantially maintain vehicle 10's speed within a certain range of 9.8 kph (e.g., within about 0.5 kph to about 1 kph of 9.8 kph).

With system 24 set in multi-speed range mode, the operator of vehicle 10 may be provided with a greater number of speed ranges than the number of gear ratios of transmission 14. For example, vehicle 10 may be provided with more than one speed range for one or more of transmission 14's gear ratios.

For example, as depicted in the table shown in FIG. 4, some embodiments of system 24 may be configured to provide a multi-speed range mode, including a 5-speed range mode for a transmission having three forward gear ratios and three reverse gear ratios. In the exemplary embodiment illustrated in the table of FIG. 4, rather than each of the second and third forward and reverse gear ratios being configured to operate in a single speed range (i.e., when system 24 is operating in the normal mode), system 24 may be configured to operate such that each of the second and third forward and reverse gear ratios may operate in two speed range modes with system 24 operating in the multi-speed mode. With system 24 operating in the normal mode, second forward gear ratio and third forward gear ratio may each provide a single speed range resulting in a vehicle speeds of, for example, about 5.7 kph and about 9.8 kph, respectively, in the forward direction. In contrast, with system 24 operating in the multi-speed mode, second forward gear ratio and third forward gear ratio may each provide two speed ranges (four speed ranges combined) resulting in vehicle speeds of, for example, about 4.2 kph, about 5.6 kph, about 7.4 kph, and about 9.8 kph, respectively, in the forward direction.

Furthermore, with system 24 operating in the normal mode, second reverse gear ratio and third reverse gear ratio may each provide a single speed range resulting in vehicle speeds of, for example, about 7.4 kph and about 12.7 kph, respectively, in the reverse direction. With system 24 operating in the multi-speed mode, however, second reverse gear ratio and third reverse gear ratio may each provide two reverse speed ranges (four speed ranges combined) resulting in vehicle speeds of, for example, about 4.6 kph, about 7.2 kph, about 8.5 kph, and about 11.2 kph, respectively, in the reverse direction. The vehicle speeds disclosed are merely exemplary, and it is contemplated that other vehicle speeds may be selected to correspond to some or all of the speed ranges.

In this exemplary manner, system 24 maybe configured to provide an operator with, for example, five speed ranges in each direction of vehicle 10's travel, even though vehicle 10 has a transmission 14, which includes three gear ratios for each direction of travel. Furthermore, system 24 may be configured to provide any combination of singular and/or plural speed ranges for one or more of the gear ratios of transmission 14. For example, system 24 may be configured to provide 8Forward speed ranges and 8 reverse speed ranges with a transmission having three forward gear ratios and three reverse gear ratios. This may be accomplished, for example, by providing a single speed range for each of the first forward and first reverse gear ratios, three speed ranges for each of the second forward and second reverse gear ratios, and four speed ranges for each of the third forward and third reverse gear ratios. Furthermore, system 24 may be adapted to provide multiple speed ranges for a transmission having more or fewer than three forward gear ratios and/or more or fewer than three reverse gear ratios; for example, a transmission configured to provide five forward gear ratios and two reverse gear ratios.

Referring to the table depicted in FIG. 4, in the normal mode of operation, system 24 provides a single speed range for each forward and reverse gear ratio, such that a total of six speed ranges are provided. For the exemplary embodiment depicted, speed ranges −3, −2, −1, 1, 2, and 3, correspond respectively to reverse gear ratios 3, 2, and 1, and forward gear ratios 1, 2, and 3. Furthermore, speed ranges −3, −2, −1, 1, 2, and 3 result in vehicle speeds of about −12.7 kph (i.e., about 12.7 kph in the reverse direction), about −7.4 kph, about −4.2 kph, about 3.2 kph, about 5.7 kph, and about 9.8 kph, respectively.

According to some embodiments, vehicle 10 may be provided with a display according to the exemplary displays 48 configured as depicted in FIGS. 2A-2F and 3A-3C. When used in conjunction with an exemplary system 24 configured to operate in manner corresponding to the table depicted in FIG. 4, for example, display 48 may provide an operator with information relating to the output speed of power plant 12 in power plant output portion 56, the current gear ratio engaged in transmission 14 in region 60, and/or the current direction of travel (i.e., forward or reverse) in region 64. Power plant output portion 56 and regions 60, 62, and 64 may be located on display panel 50 adjacent symbols 66, 68, 70, and 72, respectively.

For example, as schematically-depicted in FIG. 3A, with system 24 operating in the normal mode (e.g., 3-speed range mode), when the first forward gear ratio of transmission 14 is engaged, region 60 of display 48 shows "1," denoting that the first gear ratio of transmission 14 is engaged. Further, region 64 shows an "F," denoting that the gear ratio engaged is a forward gear ratio. In the normal mode, as system 24 changes speed ranges, regions 60 and 64 change to reflect the current gear ratio and direction of travel. For example, display 48 shown in FIG. 3B indicates that the second gear ratio in transmission 14 is engaged (as denoted by display of "2" in region 60) and that vehicle 10 is traveling in the forward direction (as denoted by display of "F" in region 64). Similarly, display 48 shown in FIG. 3C indicates that the second gear ratio in transmission 14 is engaged (as denoted by display of "2" in region 60). In contrast to FIG. 3B, display 48 shown in FIG. 3C indicates that vehicle 10 is traveling in the reverse direction rather than the forward direction (as denoted by display of "R" in region 64).

In the multi-speed mode of operation, system 24 may provide a single speed range for the first forward and reverse gear ratios of transmission 14, and two speed ranges for each of the second and third forward and reverse gear ratios, such that a total of ten speed ranges are provided—five forward speed ranges and five reverse speed ranges. For the exemplary embodiment depicted, speed ranges −5 and −4 correspond to the third reverse gear ratio; speed ranges −3 and −2 correspond to the second reverse gear ratio; speed ranges −1 and 1 correspond to the first reverse and first forward gear ratios, respectively; speed ranges 2 and 3 correspond to the second forward gear ratio; and speed ranges 4 and 5 correspond to the third forward gear ratio. Furthermore, speed ranges −5, −4, −3, −2, −1, 1, 2, 3, 4, and 5 result, respectively, in vehicle speeds of about −11.2 kph (i.e., about 11.2 kph in the reverse direction), about −8.5 kph, about −7.2 kph, about −4.6 kph, about −3.2 kph, about 3.1 kph, about 4.2 kph, about 5.6 kph, about 7.4 kph, and about 9.8 kph. As is apparent from the closer relationship between the vehicle speeds corresponding to adjacent speed ranges in the multi-speed mode, an operator of vehicle 10 may be able to more closely tailor operation of vehicle 10 to the conditions (e.g., the operation environment and/or type of operation) under which vehicle 10 is operating.

According to some exemplary embodiments, display 48 may be configured to be used in conjunction with system 24 when operating in multi-speed mode (e.g., 5-speed range mode). For example, display 48 may provide an operator with information relating to the output speed of power plant 12 in power plant output portion 56, the current gear ratio engaged in transmission 14 in region 60, information relating to current speed range in region 62, and/or the current direction of travel (i.e., forward or reverse) in region 64. Power plant output portion 56, and regions 60, 62, and 64 may be located on display panel 50 adjacent symbols 66, 68, 70, and 72, respectively.

Figure 2A:
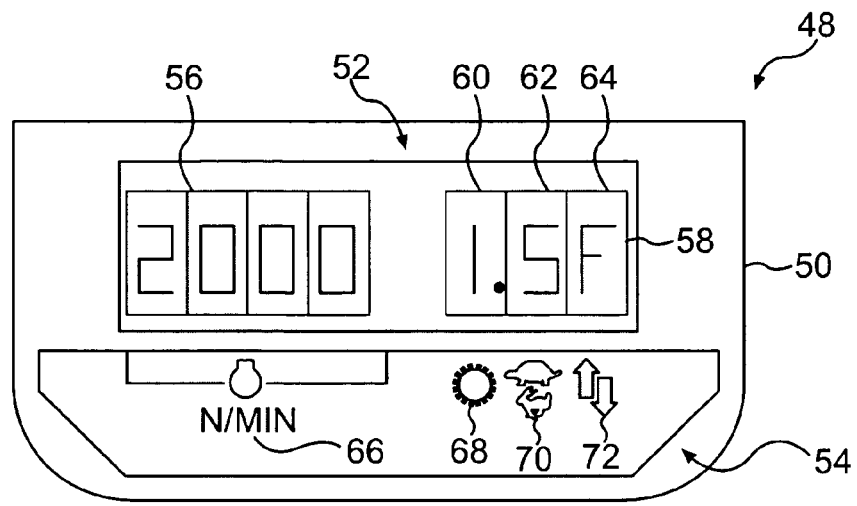
FIG. 2A is a schematic representation of an exemplary embodiment of a display indicating a first vehicle status.
Figure 2B:
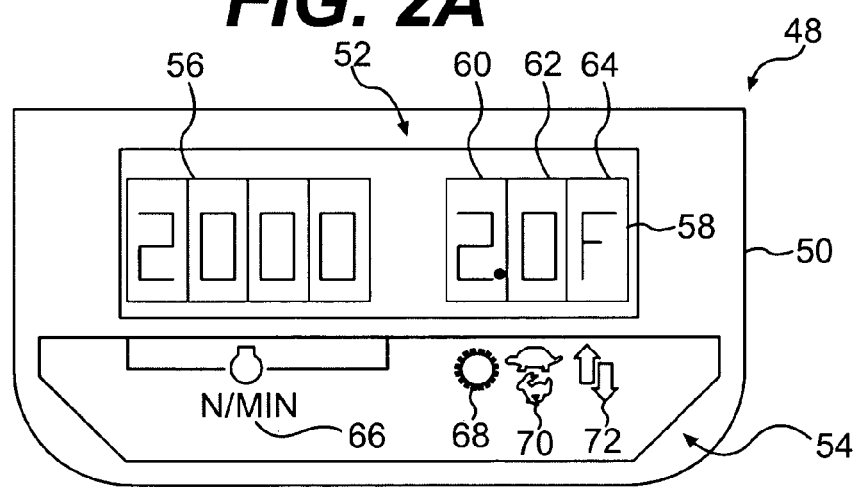
FIG. 2B is a schematic representation of an exemplary embodiment of a display indicating a further vehicle status.
Figure 2C:
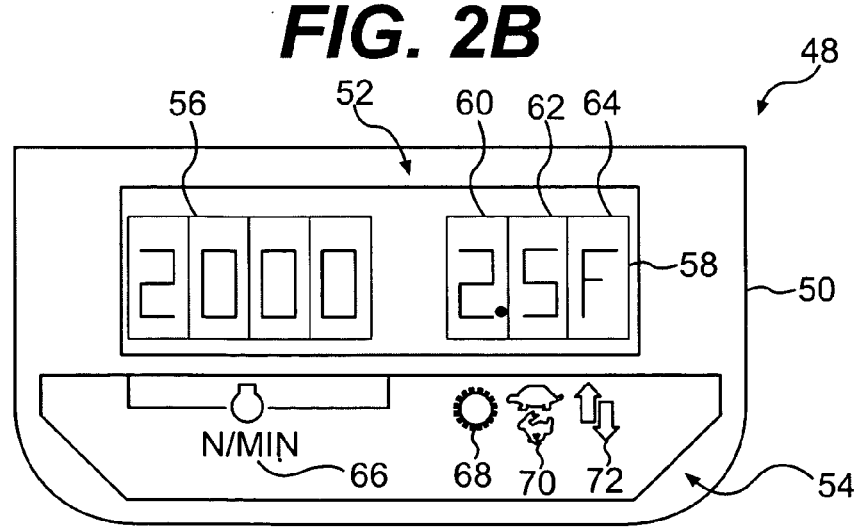
FIG. 2C is a schematic representation of an exemplary embodiment of a display indicating another vehicle status.
Figure 2D:
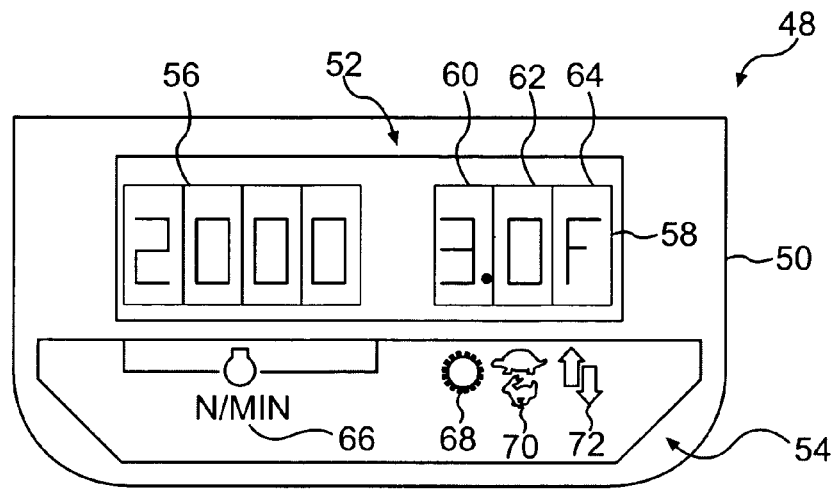
FIG. 2D is a schematic representation of an exemplary embodiment of a display indicating still a further vehicle status.

For example, as schematically-depicted in FIG. 2A with system 24 operating in multi-speed mode, when the first forward gear ratio of transmission 14 is engaged, region 60 of display 48 shows "1," denoting that the first gear ratio of transmission 14 is engaged. In addition, region 62 may be configured to display "5," denoting that system 24 is operating in multi-speed mode within the first gear ratio. Further, region 64 shows an "F," denoting that the gear ratio engaged is a forward gear ratio.

Figure 2E:
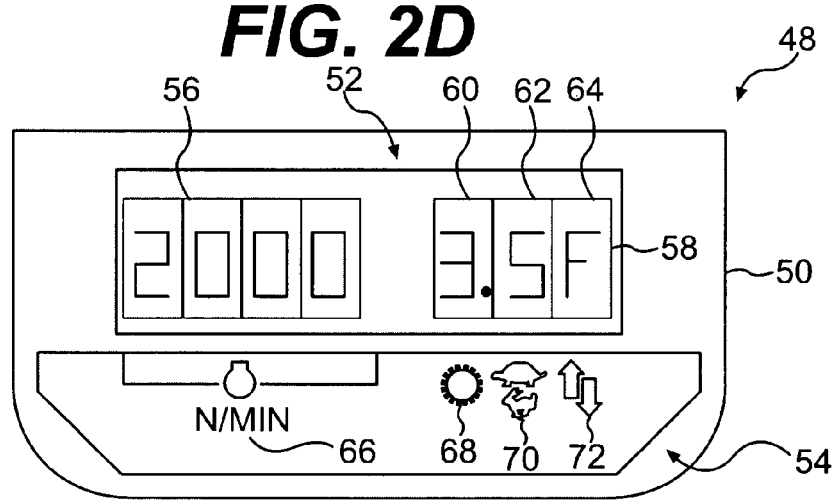
FIG. 2E is a schematic representation of an exemplary embodiment of a display indicating yet another vehicle status.
Figure 2F:
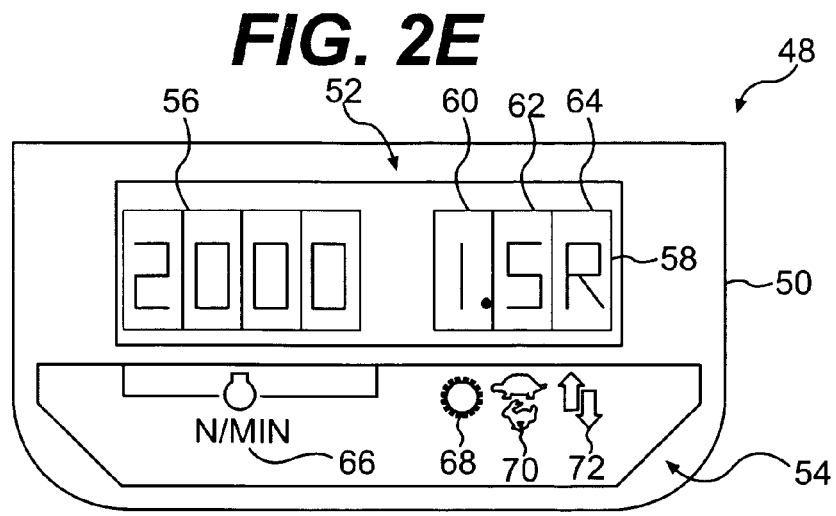
FIG. 2F is a schematic representation of an exemplary embodiment of a display indicating yet a further vehicle status.

In the multi-speed mode of operation, as system 24 changes speed ranges, regions 60, 62, and 64 change to reflect the current gear ratio, the current speed range within the current gear ratio, and direction of travel, respectively. For example, display 48 shown in FIG. 2B indicates that the second gear ratio in transmission 14 is engaged (as denoted by display of "2" in region 60); that the multi-speed mode is activated and that the first speed range within the second gear ratio is currently operating (as denoted by display of "0" in region 62); and that vehicle 10 is traveling in the forward direction (as denoted by display of "F" in region 64). Display 48 shown in FIG. 2C indicates that the second gear ratio in transmission 14 is engaged (as denoted by display of "2" in region 60); that the multi-speed mode is activated and that the second speed range within the second gear ratio is currently operating (as denoted by display of "5" in region 62); and that vehicle 10 is traveling in the forward direction (as denoted by display of "F" in region 64). Similarly, display 48 shown in FIG. 2D indicates that the third gear ratio in transmission 14 is engaged (as denoted by display of "3" in region 60); that the multi-speed mode is activated and that the first speed range within the third gear ratio is currently operating (as denoted by display of "0" in region 62); and that vehicle 10 is traveling in the forward direction (as denoted by display of "F" in region 64). As depicted in FIG. 2E, display 48 indicates that the third gear ratio in transmission 14 is engaged (as denoted by display of "3" in region 60); that the multi-speed mode is activated and that the second speed range within the third gear ratio is currently operating (as denoted by display of "5" in region 62); and that vehicle 10 is traveling in the forward direction (as denoted by display of "F" in region 64). Similarly, display 48 shown in FIG. 2F indicates that the first gear ratio in transmission 14 is engaged (as denoted by display of "1" in region 60), and that the multi-speed mode is activated (as denoted by "5" in region 62). Display 48 shown in FIG. 2F, however, indicates that vehicle 10 is traveling in the reverse direction rather than the forward direction (as denoted by display of "R" in region 64).

During operation, an operator of vehicle 10 may control speed of vehicle 10 via operation of speed range selector 46, which may be configured to provide the operator with the ability to select higher and lower speed ranges. For example, an up-shift button or lever may be provided for sequentially selecting higher speed ranges upon each depression of the up-shift button, such that system 24 changes speed ranges, for example, from a first speed range, to a second speed range, to a third speed range, and so on, until either an operator-desired speed range or the maximum speed range of system 24 has been selected for the current operation mode (i.e., normal mode or multi-speed mode). Conversely, a down-shift button or lever may be provided for sequentially selecting lower speed ranges upon each depression of the down-shift button, such that system 24 changes speed ranges, for example, from a higher speed range to the next lower speed range, and so on, until either an operator-desired speed range or the minimum speed range of system 24 has been selected for the current operation mode. According to some embodiments, by holding either the up-shift or down-shift buttons in a depressed condition, the system 24 will sequentially up-shift or down-shift speed ranges until either an operator-desired speed range has been selected, or a maximum or minimum speed range of system 24 has been selected for the current operation mode.

According to some embodiments, vehicle 10 may include a display 48, for example, as shown in FIGS. 2A-2F and FIGS. 3A-3C, configured to provide the operator with information relating power plant 12's output (e.g., output speed in rpm), the gear ratio currently engaged in transmission 14, which mode of operation system 24 is currently in, which speed range within a particular gear ratio vehicle 10 is operating in, and/or which direction vehicle 10 is traveling in.

For example, as speed range selector 46 is manipulated to change between speed ranges, the gear ratio/speed range mode display portion 58 may be configured to reflect changes in gear ratio, speed range, mode of operation, and/or direction or vehicle travel. FIGS. 2A-2E, for example, depict an exemplary display 48 as the speed ranges increase sequentially in a multi-speed mode of operation. First through fifth forward speed ranges are denoted consecutively by "1.5F," "2.0F," "2.5F," "3.0F," and "3.5F." The "1.5F" designation, for example, denotes that the first forward gear ratio of transmission 14 is engaged and that system 24 is operating in multi-speed mode. The "2.0F" designation denotes that the second forward gear ratio of transmission 14 is engaged, that system 24 is operating in multi-speed mode, and that the first speed range for the second gear ratio is selected. The "2.5F" designation denotes that the second forward gear ratio of transmission 14 is engaged, that system 24 is operating in multi-speed mode, and that the second speed range for the second gear ratio is selected. Display 48 operates in a similar manner for the "3.0F" and "3.5F" designations (see, e.g., FIGS. 2D and 2E). Display 48 may be configured to display information in a similar fashion for reverse speed ranges, for example, with designations such as "1.5R," "2.0R," "2.5R," "3.0R," and "3.5R" (see, e.g., FIG. 2F).

As shown in FIGS. 3A-3C, when system 24 is operating in normal mode, display 48 may display designations such as "1 F," "2 F," and "3 F," which denote operation in normal mode (e.g., by virtue of omission of a "0" or "5" designation in region 62 of display 48), in first, second, and third forward gear ratios, respectively. Display 48 may be configured to display information in a similar fashion for reverse speed ranges, for example, with designations such as "1 R, " "2 R," and "3 R" (see, e.g., FIG. 3C).

According to some embodiments, system 24 may be configured to control vehicle 10's speed, such that vehicle 10 operates within a certain range of predetermined speed ranges based on the gear ratio selected in transmission 14 and a desired ground speed in a manner substantially independent of load on power plant 12. For example, system 24 may be configured to determine a desired output speed of power plant 12 (e.g., in rpm) as a function of the gear ratio engaged in transmission 14 and a parameter that correlates to ground speed. The desired power plant output speed for substantially maintaining an operator's desired speed range may be determined based on, for example, the gear ratio engaged in transmission 14 and the output speed of transmission output shaft 38. For example, sensor 40 may be configured to send a signal to powertrain control module 30 indicative of the output speed of output shaft 38, and transmission 14 may be configured to send a signal indicative of the gear ratio engaged to powertrain control module 30. Based on these signals, system 24 may be configured to determine a desired power plant output speed (which may be measured, for example, at power plant output shaft 32 via sensor 34), such that vehicle 10 operates at a speed within a range of the selected speed range in a manner substantially independent of the load on power plant 12.

According to some exemplary embodiments, vehicle 10 may include a pair of ground engaging tracks 20. Some such vehicles may be used, for example, in environments and/or to perform work that may often result in power plant 12 being subjected to relatively widely varying loads. For example, a vehicle having ground engaging tracks may operate on terrain having steep inclines. As a result, an operator may maneuver such a vehicle up or down such inclines, which may result in little or no load on power plant 12 while traveling down hill or which may result in very high loads while traveling up hill. Furthermore, vehicles having ground engaging tracks may be used to grade terrain and/or pull heavy objects, which may result in high and/or widely varying loads being placed on power plant 12.

According to some embodiments, vehicle 10 may include torque converter 16, which operably couples power plant 12 to transmission 14. Torque converter 16 may be configured to transfer power from power plant 12 to transmission 14 via, for example, a viscous coupling. By virtue of the viscous coupling, the output speed of power plant 12's output shaft 32 may not necessarily be equal to the speed of transmission 14's input shaft 36. As a result, as vehicle 10 encounters a load due, for example, to traveling up a steep incline or pulling a heavy load, this load may be transferred via transmission 14 to torque converter 16. In order to maintain vehicle 10's speed, power plant 12 must increase its output speed to offset the load transferred by torque converter 16 to power plant 12. Conversely, if vehicle 10 travels down a steep incline, vehicle 10's weight will tend to increase its speed of travel down the incline. The positive load due to the vehicle 10's weight may be transferred via transmission 14 to torque converter 16. In order to maintain vehicle 10's speed, power plant 12 may be controlled to decrease its output speed to offset the positive load transferred to torque converter 16. According to some embodiments, system 24 may be configured to substantially maintain a desired speed range even when vehicle 10 is subjected to changing loads that might otherwise hasten or slow vehicle 10's speed of travel.

According to some embodiments, system 24 for controlling vehicle speed may be configured to substantially maintain an operator's desired speed range by determining a desired power plant output speed as a function of the gear ratio engaged in transmission 14 and a parameter indicative of vehicle speed, such as, for example, the speed of transmission output shaft 38. For example, desired power plant output speed $\omega_{dpp}$ may be determined according to the following equation:

$$\omega_{dpp} = m(v_v) + b;$$

where m represents a predetermined constant, $v_v$ represents vehicle speed, and b relates to the gear ratio and/or speed range selected. For example, m may be set to equal −200, $v_v$ may be measured based on a parameter that correlates to vehicle speed, and b may be selected and/or calculated to take into account maximum and/or minimum desired power plant output speeds and the selected gear ratio and/or speed range. For example, $v_v$ may be determined by measuring the speed of transmission 14's output shaft 38 via sensor 40. Other parameters that correlate to vehicle speed may be measured, such as, for example, the speed of driving member(s) 18, and/or the speed of ground engaging tracks 20. According to some embodiments, $v_v$ may be determined via global positioning systems and/or via vehicle-mounted radar systems that measure vehicle speed.

During operation of vehicle 10 including some embodiments of system 24 for controlling vehicle speed, an operator may select either a normal mode of operation or a multi-speed mode of operation for system 24, for example, via power plant speed switch 42. If the operator selects the normal mode, system 24 will provide the operator with a number of speed ranges equal to the number of gear ratios available from transmission 14, and the operator may select a desired speed range via speed range selector 46. For example, the operator may depress an up-shift or down-shift button until the desired speed range is selected, which the operator may determine via display 48 (see, e.g., FIGS. 3A-3C). Once the desired speed range has been selected, system 24 will control vehicle 10's speed such that it travels within a certain range of a particular speed associated with the selected speed range. For example, system 24 may be configured such that once a desired speed range has been selected, vehicle 10 travels within, for example, about one kph of a target vehicle speed associated with the selected speed range. Further, system 24 may be configured such that vehicle 10 travels within a certain range of the target vehicle speed regardless of the load placed on power plant 12, for example, so long as power plant 12 is capable of substantially maintaining the target speed.

If, on the other hand, the operator selects the multi-speed mode, system 24 will provide the operator with a greater number of speed ranges than the number of gear ratios available from transmission 14, and the operator may select a desired speed range via speed range selector 46. The operator may depress an up-shift or down-shift button until the desired speed range is selected, which the operator may determine via display 48 (see, e.g., FIGS. 2A-2F). Once the desired speed range has been selected, system 24 will control vehicle 10's speed such that it travels within a certain range of a particular speed associated with the selected speed range. System 24 may, for example, be configured such that once a desired speed range has been selected, vehicle 10 travels within about one kph of a target vehicle speed associated with the selected speed range. Further, system 24 may be configured such that vehicle 10 travels within a certain range of the target vehicle speed regardless of the load placed on power plant 12, for example, so long as power plant 12 is capable of substantially maintaining the target speed.

According to some embodiments, vehicle 10 may include speed control lever 44, which may be, for example, a decelerator pedal. Speed control lever 44 may be used to reduce the output speed of power plant 12, for example, prior to reversing the direction of vehicle 10's travel. For example, if vehicle 10 is a work machine, which may often cycle between travel in the forward direction and travel in the reverse direction, speed control lever 44 may be operated (e.g., depressed) such that the speed of power plant 12 is reduced prior to reversing direction. Further, speed control lever 44 may be operated to reduce power plant 12's output speed to render it easier to maneuver vehicle 10 in a relatively confined area.

Some embodiments may include an autoshift function configured to provide an operator with the ability to pre-select gear ratios upon switching directions of vehicle travel between a forward direction of travel and a reverse direction of travel. For example, in a vehicle 10 that may be operated such that it cycles between a forward direction of travel and a reverse direction of travel, the autoshift may allow the operator to pre-select a forward gear ratio for automatic selection when the operator switches to a forward direction of travel from a reverse direction of travel and/or to pre-select a reverse gear ratio for automatic selection when the operator switches to a forward direction of travel from a reverse direction of travel. For example, the operator can pre-select the second forward gear ratio and the first reverse gear ratio, such that when the operator switches from a forward direction of travel to the reverse direction, transmission 14 automatically selects the first reverse gear ratio, and when the operator switches from the reverse direction of travel to the forward direction of travel, transmission 14 automatically selects the second forward gear ratio. These gear ratios are exemplary, and system 24 may be configured such that other gear ratios are pre-selected. According to some embodiments, speed ranges rather than gear ratios may be pre-selected and/or a combination of speed ranges and gear ratios may be pre-selected (e.g., the fourth forward speed range and the third reverse gear ratio may be pre-selected).

According to some embodiments, vehicle 10 may include a system for automatically downshifting transmission 14 and/or reducing the speed range to a lower setting, for example, if vehicle 10's speed of travel falls below a certain speed. Such systems may be used to increase productivity and/or may prevent power plant 12 from experiencing an underspeed condition that might lead to stalling.

Some embodiments of a system for automatically downshifting and/or reducing the speed range may be provided with two or more settings, which trigger the automatic downshift/speed range reduction. For example, such a system may include a high setting and a low setting. When operating in the high setting, the downshift/speed range reduction may occur at a higher vehicle speed than when the system is operating in the low setting for a particular gear ratio/speed range (i.e., downshift/speed range reduction may occur in response to relatively smaller decreases in vehicle speed). According to some embodiments, the amount of vehicle speed reduction for a downshift/speed range reduction may be selected by the operator and/or may be automatically set by system 24. According to some embodiments, the system for automatically downshifting and/or reducing the speed range may be manually activated and/or deactivated.

Other embodiments of the disclosure will be apparent to those skilled in the art from consideration of the specification and practice of the embodiments disclosed herein. It is intended that the specification and examples be considered as exemplary only, with a true scope of the invention being indicated by the following claims.

What is claimed is:

1. A system for controlling the speed of a vehicle having a power plant and a transmission, the system comprising:
   a control unit configured to:
   receive a signal indicative of the speed of the vehicle,
   receive a signal indicative of a gear ratio of the transmission,
   receive a signal indicative of a desired vehicle speed range associated with the gear ratio,
   determine a desired output speed of the power plant according to:

$\omega_{dpp} = m(v_v) + b$ wherein $\omega_{dpp}$ is the desired output speed of the power plant, m is a predetermined constant, $v_v$ correlates to the signal indicative of the speed of the vehicle, and b is determined from the signal indicative of the gear ratio of the transmission and the desired vehicle speed range associated with the gear ratio, and send a signal to the power plant such that the power plant operates at the desired output speed, wherein the desired output steed substantially maintains the speed of the vehicle substantially independent of a magnitude of load on the power plant, wherein the power plant and the transmission are operably coupled via a torque converter.

2. The system of claim 1, wherein the signal indicative of the speed of the vehicle includes a signal indicative of an output speed of the transmission.

3. The system of claim 1, wherein the transmission is configured to selectively provide one of a number of gear ratios and the control unit is configured to associate a plurality of desired vehicle speed ranges associated with at least one of the number of gear ratios.

4. The system of claim 3, wherein the control unit is operable to, select between at least two modes of operation of the system, and wherein the at least two modes of operation of the system include a first mode in which the number of desired vehicle speeds equals the number of gear ratios and a second mode in which the number of desired vehicle speed ranges is greater than the number of gear ratios.

5. The system of claim 4, further including a switch configured to manually select between the at least two modes of operation of the system.

6. The system of claim 1, further including a display configured to provide information indicative of a status related to travel of the vehicle, wherein the status related to travel of the vehicle includes at least one of the speed of the power plant, a gear ratio provided by the transmission, a direction of travel of the vehicle, and a mode of operation of the system.

7. The system of claim 6, wherein the status related to travel of the vehicle. includes the gear ratio provided by the transmission and the mode of operation of the system.

8. The system of claim 1, Wherein the control unit is configured to switch the transmission from a first condition in which the vehicle travels in a forward direction in a forward gear ratio to a second condition in which the vehicle travels in a reverse direction in a reverse gear ratio, wherein the control unit is configured such that at least one of the forward gear ratio and the reverse gear ratio may he pre-selected.

9. The system of claim 1, wherein the control unit includes a power plant control module configured to control the power plant and a powertrain control module configured to control the transmission.

10. The system of claim 1, wherein the control unit is operable to select between at least two modes of operation of the system, and wherein the at least two modes of operation of the system include a first mode in which a number of speed ranges available equals a number of gear ratios provided by the transmission and a second mode in which a number of speed ranges available is greater than the number of gear ratios provided by the transmission.

11. The system of claim 1, wherein for at least one gear ratio of the transmission, a plurality of speed ranges of the power plant are associated with the at least one gear ratio to provide a plurality of predetermined target vehicle speeds.

12. A vehicle comprising:
   a power plant to provide power to the vehicle;
   a transmission operably coupled to the power plant via a torque converter;
   driving members operably coupled to the transmission, wherein the transmission is configured to transfer the power provided by the power plant to the driving members to propel the vehicle; and a control unit configured to control operation of the power plant and the transmission, the control unit being configured to:
receive a signal indicative of speed of the vehicle,
receive a signal indicative of a near ratio of the transmission,
receive a signal indicative of a desired vehicle speed range associated with the gear ratio,
determine a desired output speed of the power plant based on the signal indicative of the speed of the vehicle, the signal indicative of the gear ratio of the transmission, and the desired vehicle speed range associated with the gear ratio, and
send a signal to the power plant such that the power plant operates at the desired output speed, wherein the desired output speed maintains the speed of the vehicle substantially independent of a magnitude of load on the power plant.

13. The vehicle of claim 12, further including a pair of ground engaging tracks operably coupled to the driving members.

14. The vehicle of claim 12, wherein the transmission is configured to selectively provide one of a number of gear ratios and the system is configured to determine at least one desired vehicle speed associated with each gear ratio.

15. The vehicle of claim 14, wherein the control unit is operable to select between at least two modes of operation, and wherein the at least two modes of operation include a first mode in which the number of desired vehicle speeds equals the number of gear ratios and a second mode in which the number of desired vehicle speeds is greater than the number of gear ratios.

16. The vehicle of claim 12, further including a display configured to provide information indicative of a status related to travel of the vehicle, wherein the status related to travel of the vehicle includes at least one of the speed of the power plant, a gear ratio provided by the transmission, a direction of travel of the vehicle, and a mode of operation.

17. The vehicle of claim 16, wherein the status related to travel of the vehicle includes the gear ratio provided by the transmission and the mode of operation.

18. The vehicle of claim 17, wherein the display is configured to display the gear ratio provided by the transmission in a manner substantially independent of the mode of operation displayed.

19. The vehicle of claim 12, wherein the control unit is configured to control the power plant and transmission such that for each gear ratio provided by the transmission, the vehicle travels at at least one speed range that corresponds to the gear ratio.

20. The vehicle of claim 19, wherein the control unit is configured to change at least one of the gear ratio and the speed range upon sensing that the speed of the vehicle has dropped below the speed range by more than a predetermined amount.

21. The vehicle of claim 20, wherein the control unit is operable to select between at least two modes of operation, and wherein the at least two modes of operation include a first mode in which the number of speed ranges available equals the number of gear ratios provided by the transmission and a second mode in which a number of speed ranges available is greater than the number of gear ratios provided by the transmission.

22. The, vehicle of claim 21, further including a switch configured to manually select between the at least two modes of operation.

23. The vehicle of claim 12, wherein the signal indicative of the speed of the vehicle includes a signal indicative of an output speed of the transmission.

24. The vehicle of claim 12, wherein the control unit is configured to switch the transmission from a first condition in which the vehicle travels in a forward direction in a forward gear ratio to a second condition in which the vehicle travels in a reverse direction in a reverse gear ratio, wherein the control unit is configured such that at least one of the forward gear ratio and the reverse gear ratio may be pre-selected.

25. The vehicle of claim 12, wherein the control unit includes a power plant control module configured to control the power plant and a powertrain control module configured to control the transmission.

26. The vehicle of claim 12, wherein for at least one gear ratio of the transmission, a plurality of speed ranges of the power plant are associated with the at least one gear ratio to provide a plurality of predetermined target vehicle speeds.

27. A method for controlling the speed of a vehicle having a power plant and a transmission, the method comprising:
sensing a signal indicative of the speed of the vehicle;
determining a desired output speed of the power plant according to:

$$\omega_{dpp} = m(v_v) + b,$$

wherein $\omega_{dpp}$ is the desired output speed of the power plant, m is a predetermined constant, $v_v$ correlates to the signal indicative of the speed of the vehicle, and b is determined from a signal indicative of the gear ratio provided by the transmission and a desired vehicle speed associated with the gear ratio;
sending a signal to the power plant such that the power plant operates at the desired output speed of the power plant, wherein the desired output speed of the power plant substantially maintains the speed of the vehicle substantially independent of a magnitude of load on the power plant.

* * * * *